(12) United States Patent
Giambra et al.

(10) Patent No.: US 11,841,141 B2
(45) Date of Patent: Dec. 12, 2023

(54) REVERSE FLOW COMBUSTOR

(71) Applicants: GE AVIO S.r.l, Rivalta di Torino (IT); General Electric Company, Boxford, MA (US)

(72) Inventors: Massimo Giovanni Giambra, Rivalta di Torino (IT); Joseph Douglas Monty, Boxford, MA (US); Stephen John Howell, West Newbury, MA (US)

(73) Assignees: GENERAL ELECTRIC COMPANY, Schenectady, NY (US); GE AVIO S.R.L., Rivalta di Torino (IT)

( * ) Notice: Subject to any disclaimer, the term of this patent is extended or adjusted under 35 U.S.C. 154(b) by 33 days.

(21) Appl. No.: 17/072,465

(22) Filed: Oct. 16, 2020

(65) Prior Publication Data
US 2021/0041106 A1    Feb. 11, 2021

Related U.S. Application Data

(63) Continuation of application No. 16/020,312, filed on Jun. 27, 2018, now Pat. No. 10,823,421.

(30) Foreign Application Priority Data

Jul. 25, 2017   (EP) .................................... 17425080

(51) Int. Cl.
  *F23R 3/54*     (2006.01)
  *F23R 3/06*     (2006.01)
(Continued)

(52) U.S. Cl.
CPC ................ *F23R 3/54* (2013.01); *F02C 3/145* (2013.01); *F02C 7/18* (2013.01); *F23R 3/06* (2013.01);
(Continued)

(58) Field of Classification Search
CPC ...... F23R 3/54; F23R 3/04; F23R 3/06; F23R 3/02; F02C 3/145; F02C 7/18
See application file for complete search history.

(56) References Cited

U.S. PATENT DOCUMENTS 3,844,116 A   10/1974   Matto
5,209,066 A    5/1993   Barbier et al.
(Continued)

FOREIGN PATENT DOCUMENTS

CH     267189 A     3/1950
CN    104676650 A   6/2015

OTHER PUBLICATIONS

Extended European Search Report and Opinion issued in connection with corresponding EP Application No. 17425080.3 dated Jan. 15, 2018.
(Continued)

*Primary Examiner* — Steven M Sutherland
(74) *Attorney, Agent, or Firm* — Venable LLP; Edward A. Kmett; Michele V. Frank

(57) ABSTRACT

An apparatus and method for a reverse flow combustor, the reverse flow combustor including a straight portion, a dilution portion and a curved portion. The reverse flow combustor receives a flow of fuel that is ignited and mixed with cooling air to form a flow of combustion gases. The flow of combustion gases travels through the reverse flow combustor to a turbine section of an engine.

20 Claims, 4 Drawing Sheets

(51) Int. Cl.
*F02C 3/14* (2006.01)
*F02C 7/18* (2006.01)
*F23R 3/46* (2006.01)
*F01D 9/02* (2006.01)
*F23R 3/50* (2006.01)

(52) U.S. Cl.
CPC ............... *F23R 3/46* (2013.01); *F01D 9/023* (2013.01); *F05D 2220/323* (2013.01); *F05D 2240/35* (2013.01); *F23R 3/50* (2013.01); *F23R 2900/00017* (2013.01)

(56) References Cited

U.S. PATENT DOCUMENTS

| | | | |
|---|---|---|---|
| 5,784,876 A * | 7/1998 | Alkabie | F23R 3/06 60/737 |
| 7,350,358 B2 | 4/2008 | Patel et al. | |
| 8,739,547 B2 | 6/2014 | Jarmon et al. | |
| 8,745,989 B2 | 6/2014 | Prociw et al. | |
| 8,794,005 B2 | 8/2014 | Rudrapatna et al. | |
| 9,400,100 B2 | 7/2016 | Dedebout et al. | |
| 2005/0229604 A1 | 10/2005 | Chen | |
| 2006/0042263 A1 | 3/2006 | Patel et al. | |
| 2007/0227150 A1 | 10/2007 | Alkabie | |
| 2007/0271926 A1 | 11/2007 | Alkabie | |
| 2010/0077763 A1 | 4/2010 | Alkabie | |
| 2015/0059349 A1 | 3/2015 | Patel et al. | |

OTHER PUBLICATIONS

Chinese Patent Office, Office Action re Chinese Patent Application No. 201810825354.8, dated Jan. 10, 2020, 9 pages, China.

* cited by examiner

REVERSE FLOW COMBUSTOR

CROSS-REFERENCE TO RELATED APPLICATION(S)

This application is a continuation of U.S. patent application Ser. No. 16/020,312, filed Jun. 27, 2018, now allowed, which claims priority to European Patent Application No. 174250803 filed Jul. 25, 2017, which are incorporated herein by reference in their entirety.

BACKGROUND OF THE INVENTION

Turbine engines are driven by a flow of air and combusted gases passing through the engine onto a multitude of rotating turbine blades.

A reverse flow combustor can be provided within the engine, the reverse flow combustor being used to reverse flow twice, once to combust the gas and a second time to exhaust the gas through the turbine section. Shortening the length of a typical reverse flow combustor is beneficial in terms of cost and engine efficiency based on weight.

BRIEF DESCRIPTION OF THE INVENTION

In one aspect, the present disclosure relates to a reverse flow combustion liner comprising a straight portion having first and second ends, the first end defining a dome inlet having a predetermined height, a turn portion having third and fourth ends, the fourth end defining a turbine inlet, and a decreasing cross-sectional area from the third end to the fourth end, and a dilution portion coupling the second end to the third end and having an axial length of less than or equal to 20% of the predetermined height, wherein the dilution portion defines a tangency curve where the dilution portion meets the turn portion.

In another aspect, the present disclosure relates to a reverse flow combustor for a gas turbine engine, the reverse flow combustor comprising a combustion liner defining a combustor chamber extending from a dome assembly at a first end and defining a dome height to a turn defining a tangency curve, and a dilution portion defined by the combustion liner extending from a second end to the tangency curve, wherein an axial length of the dilution portion is less than or equal to 20% of the dome height.

DETAILED DESCRIPTION OF THE INVENTION

Figure 1:
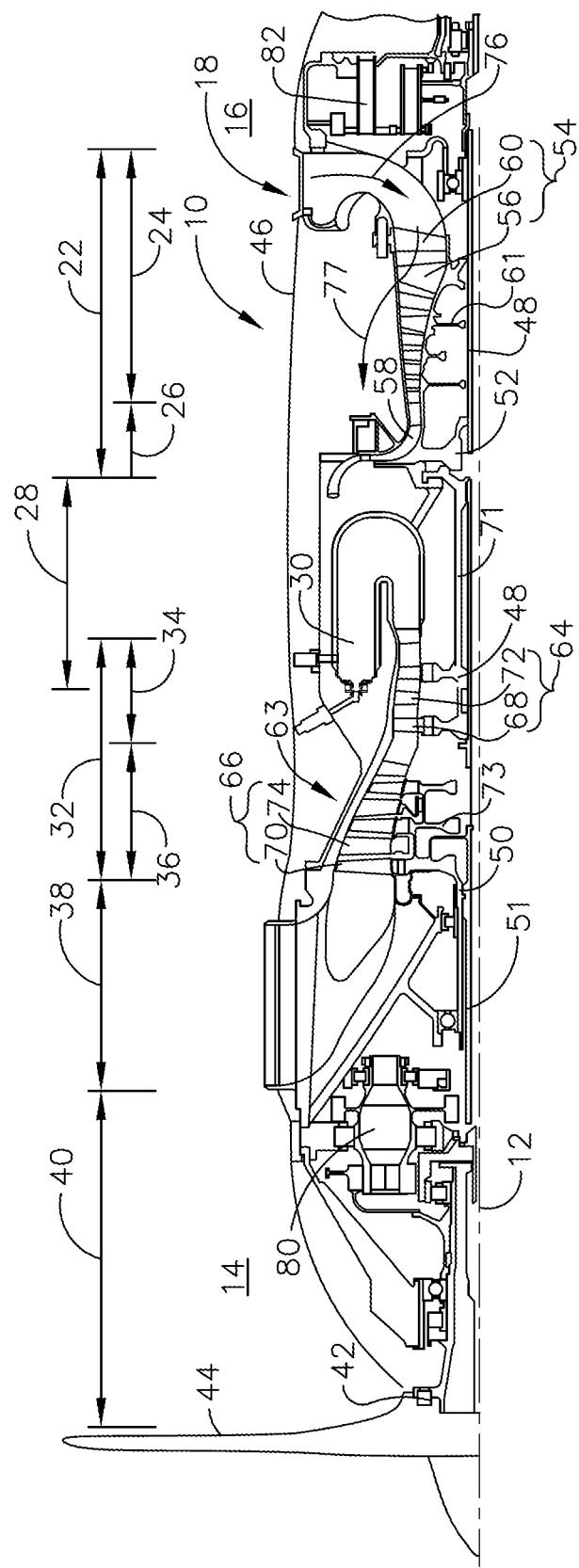
FIG. 1 is a schematic cross-sectional diagram of a free turbine engine for an aircraft with a reverse flow combustor.

Aspects of the disclosure described herein are directed to a reverse flow combustor. For purposes of illustration, the present disclosure will be described with respect to a free turbine engine. It will be understood, however, that aspects of the disclosure described herein are not so limited and that a reverse flow combustor as described herein can be implemented in other turbine engines, including but not limited to turbojet, turboprop, turboshaft, and turbofan engines. Aspects of the disclosure discussed herein may have general applicability within non-aircraft engines having a reverse flow combustor, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 is a free-turbine engine where air is taken in at an inlet 18 and flows in a general aft 16 to forward 14 direction. The engine 10 includes, in downstream serial flow relationship, a compressor section 22 including the inlet 18, a compressor 24 and a centrifugal compressor 26, a combustion section 28 including a combustor 30, a turbine section 32 including an HP turbine 34 and an LP turbine 36, an exhaust section 38, and a propeller section 40. The propeller section 40 includes a propeller hub 42 having a plurality of propeller blades 44 disposed radially about the centerline 12. An engine casing 46 can form an annular casing for each of the sections.

An HP shaft or spool 48 disposed coaxially about the centerline 12 of the engine 10 drivingly connects the HP turbine 34 to the compressor 24 and centrifugal compressor 26. An LP shaft or spool 50, which is disposed coaxially about the centerline 12 of the engine 10 in line with and separate from the HP spool 48, drivingly connects the LP turbine 36 to the propeller hub 42. The spools 48, 50 are rotatable about the engine centerline 12 and couple to a plurality of rotatable elements, which can collectively define a rotor 51.

The compressor 24 includes at least one compressor stage 54, in which a set of compressor blades 56 rotate relative to a corresponding set of static compressor vanes 60 (also called a nozzle) to compress or pressurize the stream of fluid passing through the stage. The centrifugal compressor 26 can include an impeller 52 having a set of impeller blades 58. In a single compressor stage 54 multiple compressor blades 56 can be provided in a ring and can extend radially outwardly relative to the centerline 12, from a blade platform to a blade tip, while the corresponding static compressor vanes 60 are positioned upstream of and adjacent to the rotating blades 56. It is noted that the number of blades, vanes, and compressor stages shown in FIG. 1 were selected for illustrative purposes only, and that other numbers are possible.

The blades 56, 58 for a stage of each compressor 24, 26 mount to a disk 61, which mounts to the corresponding HP spool 48, with each stage having its own disk 61. The vanes 60 for a stage of the compressor mount to the engine casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68 for the HP turbine stages 64 mount to a disk 71, which mounts to the corresponding HP spool 48, with each stage having a dedicated disk 71. The blades 70 for the LP turbine stages 66 mount to a disk 73, which mounts to the corresponding LP spool 50, with each stage having a dedicated disk 73. The vanes 72, 74 for a stage of the respective turbine 34, 36 can mount to the engine casing 46 in a circumferential arrangement.

Complementary to the rotor portion, the stationary portions of the engine 10, such as the static vanes 60, 72, 74 among the compressor and turbine sections 22, 32 are also referred to individually or collectively as a stator 63. As such, the stator 63 can refer to the combination of non-rotating elements throughout the engine 10.

In operation, the airflow entering the inlet 18 is channeled into the compressor 24, which then supplies pressurized air 76 to the centrifugal compressor 26, which further pressurizes the air. The pressurized air 76 from the centrifugal compressor 26 mixes with fuel in the combustor 30 where the fuel combusts, thereby generating combustion gases. The HP turbine 34 extracts some work from these gases, which drives the compressor 24 and centrifugal compressor 26. The HP turbine 34 discharges the combustion gases into the LP turbine 36, which extracts additional work to drive the propeller hub 42, and the exhaust gas is ultimately discharged from the engine 10 via the exhaust section 38.

A portion of the pressurized airflow 76 can be drawn from the compressor section 22 as bleed air 77. The bleed air 77 can be drawn from the pressurized airflow 76 and utilized in other areas of the engine or aircraft, such as provided to engine components requiring cooling. The temperature of pressurized airflow 76 entering the combustor 30 is significantly increased relative to that of the airflow entering at the inlet 18. As such, cooling provided by the bleed air 77 is necessary for operating of such engine components in the heightened temperature environments.

The LP turbine 36 drives the LP spool 50 to rotate the propeller hub 42 and in turn the propeller blades 44. A reduction gearbox 80 is provided between the LP spool 50 and the propeller hub 42. Additionally an accessory gear box 82 can be provided to power other parts of the engine 10, which may include by way of non-limiting example, fuel pumps, fuel control, oil pumps, a starter/generator, and a tachometer.

Figure 2:
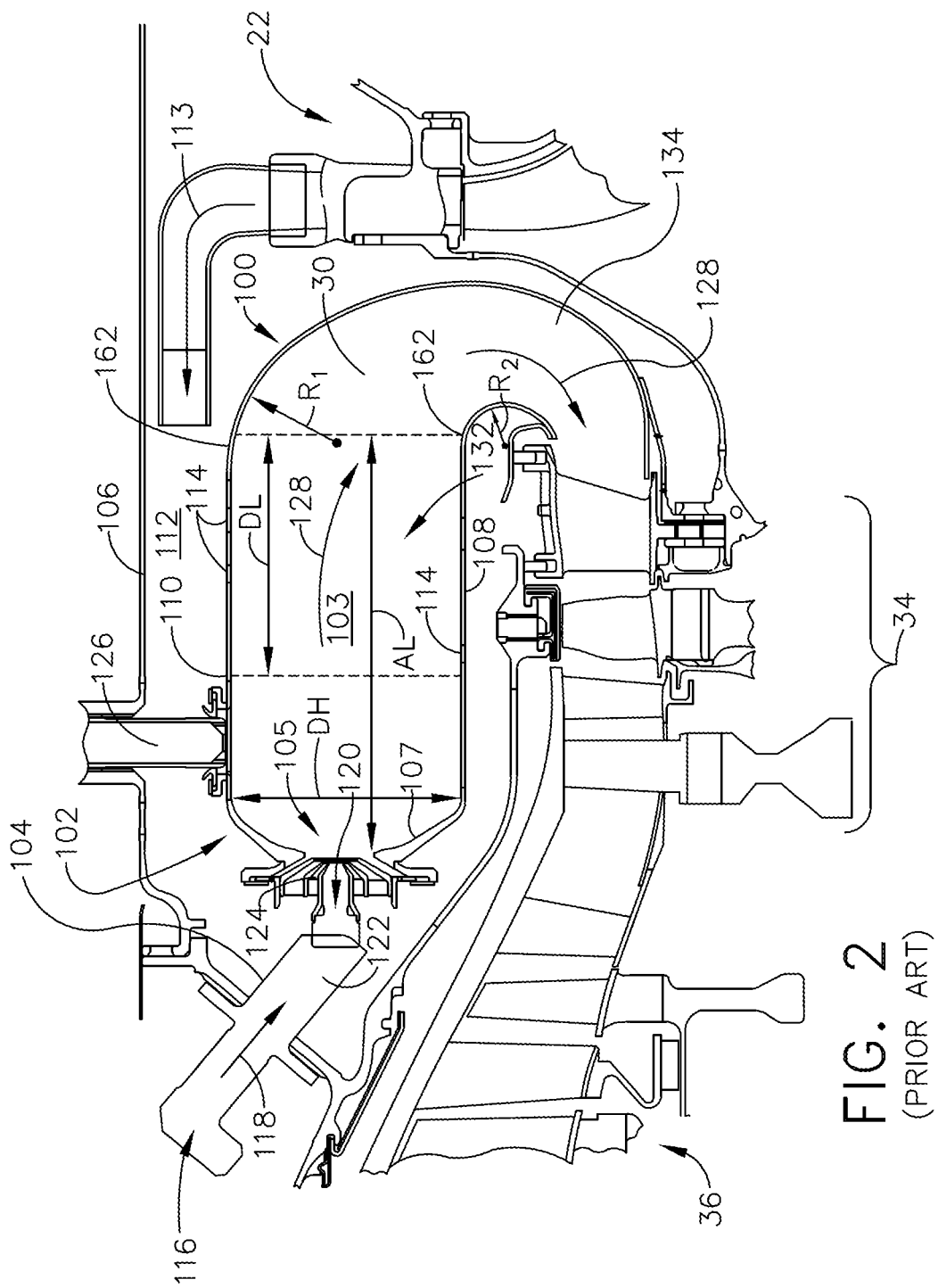
FIG. 2 is an enlarged cross-sectional view of a reverse flow combustor from the prior art.

FIG. 2 depicts a cross-section view of a reverse flow combustor 30 according to the prior art. The reverse flow combustor 30 is disposed radially outwardly of the HP turbine 34 and axially upstream and forward of the LP turbine 36. The reverse flow combustor 30 can include an annular liner assembly 100 and a dome assembly 102 defining a combustor chamber 103, and a plurality of fuel injectors 104 fluidly coupled to the combustor chamber 103. The reverse flow combustor 30 is disposed within a combustor casing 106.

An inner portion 108 of the annular liner assembly 100 can surround the HP turbine 34. An outer portion 110 of the annular liner assembly 100 along with the combustor casing 106 defines at least a portion of a compressed air passageway 112 through which compressed air 113 can flow from the compressor section 22 to the reverse flow combustor 30. A plurality of dilution holes 114 can be provided in the annular liner assembly 100 allowing passage of at least a portion of the compressed air 113 from the compressed air passageway 112 to the combustor chamber 103.

The plurality of fuel injectors 104 is coupled to and disposed within the dome assembly 102 at a dome inlet 105 comprising a flare cone 107. The dome inlet 105 defines a dome height (DH). The plurality of fuel injectors 104 includes a fuel inlet 116 that is adapted to receive a flow of fuel 118, a fuel outlet 120 that is in fluid communication with the combustor chamber 103, and a linear fuel passageway 122 extending therebetween. It should be appreciated that one or more of the fuel injectors 104 can have different characteristics and that the plurality of fuel injectors 104 is for illustrative purposes only and is not intended to be limiting. A swirler 124 can be provided at the dome inlet 105 to swirl incoming air in proximity to the fuel exiting the fuel injector 104 and provide a homogeneous mixture of air and fuel entering the combustor.

The compressed air 113 and fuel 118 is supplied to the combustor chamber 103 via the dome inlet 105, and is then ignited within the combustor chamber 103 by one or more igniters 126 to thereby generate combustion gas 128. The combustion gas 128 is mixed using additional air supplied through the plurality of dilution holes 114 provided in the inner and outer portions 108, 110 of the annular liner assembly 100 of the combustor chamber 103, and mixes within a dilution portion 132 of the combustor chamber 103, after which the combustion gas 128 flows through a turn portion 134 and exits into the HP turbine 34. A first and second radii R1, R2 meet the inner and outer portions 108, 110 at the tangency curve 162 such that the curve is defined as the annular line at which the dilution portion 132 meets the turn portion 134. The dilution portion 132 can also be called a dilution zone or a mixing zone and have an axial length (DL). The gas exhausted from the HP turbine 34 is then directed into the LP turbine 36. A tangency curve 162 defines the beginning of the dilution portion 132. An axial length (AL) measured from the flare cone 107 to the tangency curve 162 is at least 180% of the dome height (DH).

Figure 3:
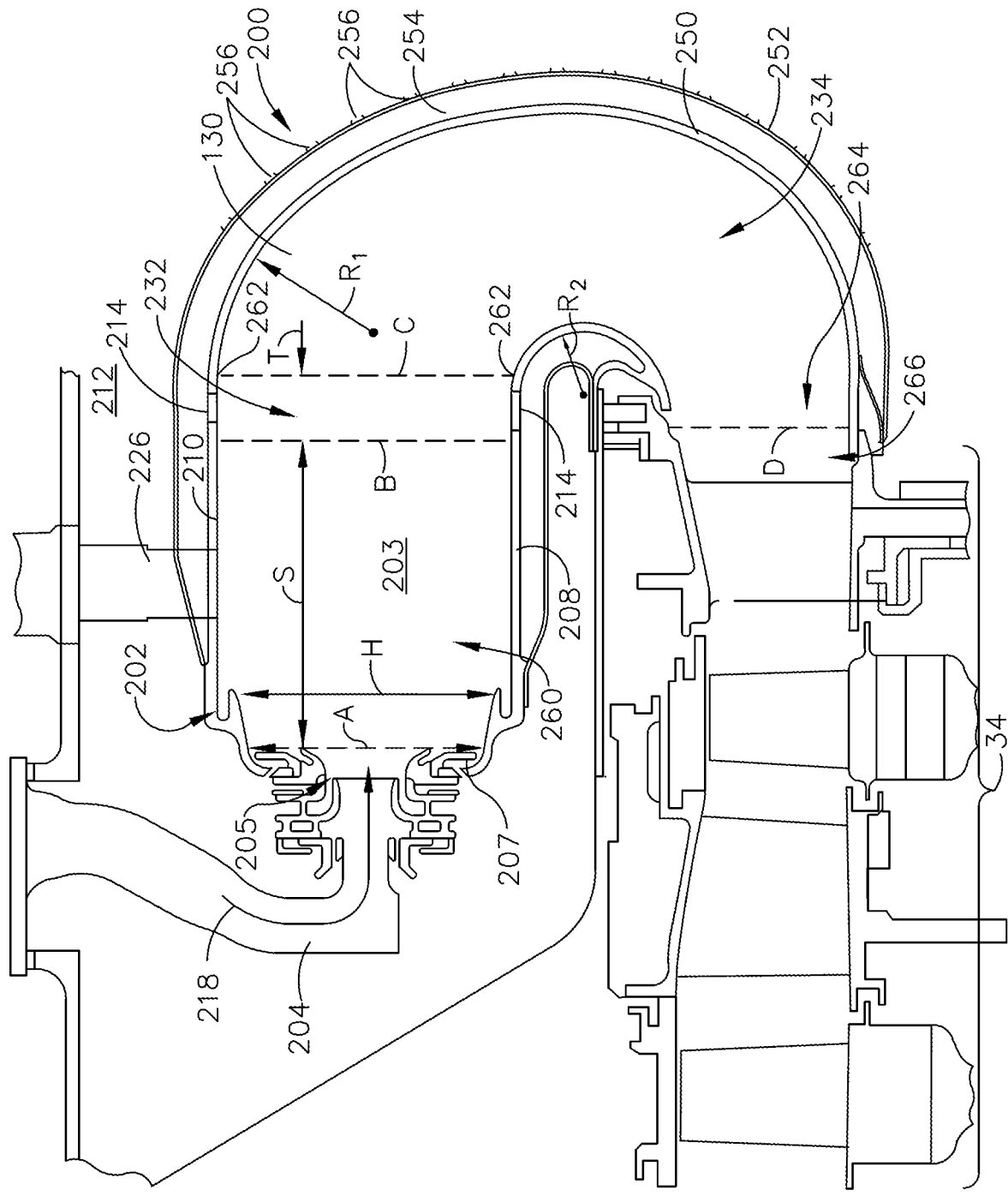
FIG. 3 is an enlarged cross-sectional view of a reverse flow combustor for the free turbine engine of FIG. 1.

FIG. 3 illustrates a reverse flow combustor 130 according to a preferred aspect of the disclosure described herein. The reverse flow combustor 130 has similarities to the reverse flow combustor 30 of the prior art, therefore, like parts will be identified with like numerals increased by 100. It should be understood that the description of the like parts of the reverse flow combustor 30 apply to those of the reverse flow combustor 130, unless otherwise noted.

An annular liner assembly 200 and a dome assembly 202 define a combustor chamber 203, and a plurality of fuel injectors 204 is fluidly coupled to the combustor chamber 203. The annular liner assembly 200 can include an interior liner 250 and an exterior liner 252 defining a cooling region 254 there between. A plurality of cooling holes 256 can be provided throughout the exterior liner 252.

A set of dilution holes 214 is provided in the interior liner 250 and can also be provided in the exterior liner 252 such that the set of dilution holes 214 circumscribe and fluidly couple a compressed air passageway 212 with the combustor chamber 203. The set of dilution holes 214 can be a row or multiple rows of dilution holes 214 axially spaced from each other and annularly disposed around the annular liner assembly 200. In a preferred aspect of the disclosure, the set of dilution holes 214 is a single row of dilution holes, however, additional smaller or "trim" holes may be applied in additional rows if required. It should be understood that the annular liner assembly 200 can be a single liner wherein the single annular liner includes the set of dilution holes 214.

The annular liner assembly 200 includes a straight portion 260, a dilution portion 232, and a turn portion 234. The straight portion 260 extends from a first end (A) at the dome assembly 202 defined by a flare cone 207. The straight portion 260 can also be called a primary zone or igniting zone. The dome assembly 202 defines a dome inlet 205 having a predetermined height or dome height (H), defining a diameter at the first end (A). The straight portion 260 terminates just forward of the plane of the dilution holes 214 in the dilution portion 232 at a second end (B) to define an axial length (S) equal to 100% of the dome height (H) from the flare cone 207. It is contemplated that the axial length (S) of the straight portion 260 can between 90% and 130% of the dome height (H).

The second end (B) is located just forward of the set of dilution holes 214 such that the dilution holes 214 are within the dilution portion 232. The dilution portion 232 defines an axial length (T) equal to or less than 30% of the dome height (H). It is further contemplated that the axial length (T) of the dilution portion 232 can be 20% of the dome height (H). The dilution portion 232 extends from the second end (B) to a third end (C) to define the axial length (T).

The third end (C) defines a tangency curve 262 from where the turn portion 234 begins. A first and second radii R1, R2 meet the inner and outer portions 208, 210 at the tangency curve 262 such that the curve is defined as the annular line at which the dilution portion 232 meets the turn portion 234. The tangency curve 262 can be located at an axial distance (S+T) 130% of the dome height (H) as measured from the flare cone 207. It is contemplated that the axial length (S+T) can between 110% and 150% of the dome height (H).

The turn portion 234 extends from the third end (C) to a fourth end (D) defining a combustor outlet 264. The combustor outlet 264 transitions to a turbine inlet 266 for an HP turbine 34 (FIG. 1). The turn portion 234 redirects fuel 218 from a primarily aft direction within the combustor chamber 203 to a primarily forward direction at the HP turbine 34.

It should be understood that the axial measurements made are from exemplary locations and are not limited to being with measured with respect to the flare cone 207 and tangency curve 262. It is contemplated that axial measurements can be made from anywhere within the dome assembly 202 and any point defining a beginning of a turn portion within the combustor chamber 203. The axial length (T) of the dilution portion 232 can be anywhere from 10% to 30% of the dome height (H) as described herein.

Figure 4:
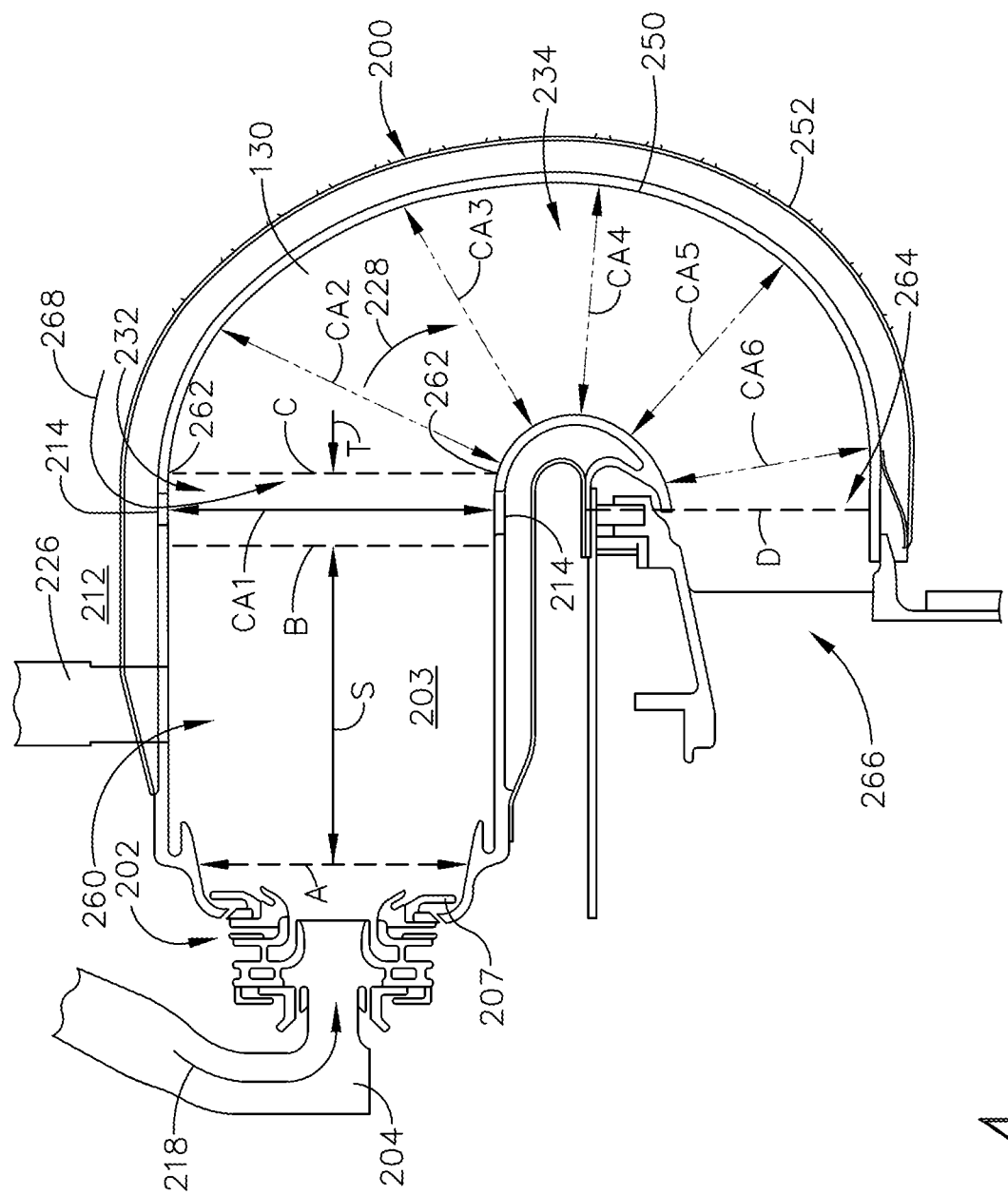
FIG. 4 is another cross-sectional view of the reverse flow combustor of FIG. 3 illustrating varying combustor widths.

Turning to FIG. 4, a cross-sectional view of the reverse combustor 130 illustrates the turn portion 234 with a continuously decreasing cross-sectional area (CA) extending from the third end (C) to the fourth end (D). The rate at which the cross-sectional area (CA) decreases can be a constant rate; by way of non-limiting example, CA2 is 7% less than CA1 and CA3 is also 7% less than CA2 and so on. The rate need not be constant, and the differences between consecutive cross-sectional areas located within 10 degrees of each other with respect to a radial plane and can be 10% or less than the previous cross-sectional area (CA).

A method of mixing diluting air 268 in the reverse flow combustor 130 as described herein includes injecting fuel 218 into the combustor chamber 203 from the dome assembly 202. The fuel 218 is ignited with an ignitor 226 within the combustor chamber 203 to produce combustion gasses 228. The method then includes injecting diluting air 268 into the combustor chamber 203 through the set of dilution holes 214 located in the dilution portion 232 forward of the tangency curve 262 between the turn portion 234 and the straight portion 260 of the combustor chamber 203. The axial length (T) of the dilution portion 232 is significantly less than the axial length (DL) of the dilution portion 132 for combustion chamber 103 (FIG. 2). The method therefore further includes mixing the diluting air 268 with the combustion gasses 228 in the turn portion 234 of the combustor chamber 203.

Aspects of the disclosure as described herein are directed towards a reverse flow combustor designed in order to minimize an overall length combusted gases flow within a combustor chamber. The combustor consists of a conventional straight portion or primary zone and a short dilution portion or dilution zone. Providing a single row of openings immediately forward of the tangency curve to the turn portion utilizes the natural trajectory taken by the diluting air when introduced and maximizes the amount of mixing between the combusted gases and the diluting air in a small dilution portion. Additional mixing still takes place in the turn portion and fully mixes prior to being introduced to the turbine section.

Conventional reverse flow combustors have a turn portion requiring additional cooled surface area which requires air that would otherwise be used for dilution and combustion. This added cooling requirement in a conventional reverse flow combustor limits the combustor to lower pressure ratios of 12 to 1 or less. Typically dilution and mixing are complete prior to the gases entering the turning duct, such that the combustor length ahead of the turn portion is similar to that of a comparable axial combustor. The reverse flow combustor as described herein enables the final stage of dilution mixing to occur in the turn portion, therefore allowing for an overall shorter combustor chamber and consequently reduced cooled surface area requirements.

Benefits associated with the reverse flow combustor as described herein include reducing a cooled surface area of the combustor to minimize cooling air required to maintain liner temperatures within acceptable limits, while still permitting a sufficient primary zone volume for flame stabilization and ignition. There is also a benefit in terms of engine weight and packaging by providing an overall shorter combustion liner and casing. The saving in cooling air requirements permits application of a reverse flow combustor to a higher pressure ratio cycle, by way of non-limiting example to a 16 to 1 pressure ratio cycle.

While described with respect to a free turbine propeller engine, it should be appreciated that the reverse flow combustor as described herein can be for any engine with a high pressure ratio engine cycle. It should be appreciated that application of aspects of the disclosure discussed herein are not limited to turbine engines with propeller sections, but is applicable to engines with fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A reverse flow combustion liner comprising:
   a straight portion having a first end and a second end substantially parallel with the first end, the first end defining a dome inlet having a predetermined height;
   a turn portion having a third end and a fourth end, the fourth end defining a turbine inlet, and the turn portion having a decreasing cross-sectional area from the third end to the fourth end; and
   a dilution portion coupling the second end to the third end and having an axial length of less than or equal to 20% of the predetermined height, wherein the dilution portion defines a tangency curve at the third end where the dilution portion meets the turn portion, and the second end and the third end being substantially parallel with each other.

2. The reverse flow combustion liner of claim 1, further comprising a set of dilution holes is provided in the reverse flow combustion liner axially forward from the tangency curve.

3. The reverse flow combustion liner of claim 1, further comprising a set of dilution holes located in the dilution portion upstream of the tangency curve.

4. The reverse flow combustion liner of claim 1 wherein the dilution portion has an axial length of less than or equal to 10% of the predetermined height.

5. The reverse flow combustion liner of claim 1 wherein the decreasing cross-sectional area is continuously decreasing.

6. The reverse flow combustion liner of claim 5 wherein a rate at which the continuously decreasing occurs is constant.

7. The reverse flow combustion liner of claim 1 wherein the decreasing cross-sectional area is not constant.

8. The reverse flow combustion liner of claim 1 wherein the reverse flow combustion liner comprises an interior liner and an exterior liner defining a cooling region there between.

9. The reverse flow combustion liner of claim 8, further comprising a set of dilution holes provided in the interior liner and a plurality of cooling holes provided on the exterior liner.

10. The reverse flow combustion liner of claim 9 wherein the set of dilution holes are annularly disposed around the reverse flow combustion liner.

11. A reverse flow combustor for a gas turbine engine, the reverse flow combustor comprising:
    a combustion liner defining a combustor chamber extending from a dome assembly at a first end of the combustion liner and defining a dome height at the first end to a turn portion of the combustion liner defining a tangency curve; and
    a dilution portion defined by the combustion liner extending from the tangency curve to a second end between the first end and the tangency curve, wherein an axial length of the dilution portion is less than or equal to 20% of the dome height.

12. The reverse flow combustor of claim 11, further comprising a set of dilution holes provided in the combustion liner, wherein the set of dilution holes are located in the dilution portion immediately upstream of the tangency curve.

13. The reverse flow combustor of claim 12 wherein the set of dilution holes are annularly disposed around the combustion liner.

14. The reverse flow combustor of claim 11, wherein the turn portion includes a third end defining the beginning of the turn portion and a fourth end, wherein the fourth end defines a turbine inlet.

15. The reverse flow combustor of claim 14 wherein the turn portion has a decreasing cross-sectional area from the third end to the fourth end.

16. The reverse flow combustor of claim 15 wherein the decreasing cross-sectional area is continuously decreasing at a constant rate.

17. The reverse flow combustor of claim 15 wherein the decreasing cross-sectional area is not constant.

18. The reverse flow combustor of claim 11 wherein the combustion liner comprises an interior liner and an exterior liner defining a cooling region there between.

19. The reverse flow combustor of claim 18 further comprising a set of dilution holes provided in the interior liner and a plurality of cooling holes provided on the exterior liner.

20. The reverse flow combustor of claim 11 wherein the dilution portion has an axial length of less than or equal to 10% of the dome height.

* * * * *